US008208981B2

(12) United States Patent
Fukagawa et al.

(10) Patent No.: US 8,208,981 B2
(45) Date of Patent: Jun. 26, 2012

(54) MIMO COMMUNICATION DEVICE

(75) Inventors: Takashi Fukagawa, Kanagawa (JP); Yoichi Nakagawa, Tokyo (JP); Masato Ukena, Osaka (JP)

(73) Assignee: Panasonic Corporation, Osaka (JP)

( * ) Notice: Subject to any disclaimer, the term of this patent is extended or adjusted under 35 U.S.C. 154(b) by 313 days.

(21) Appl. No.: 12/593,572

(22) PCT Filed: Mar. 28, 2008

(86) PCT No.: PCT/JP2008/000806

§ 371 (c)(1),
(2), (4) Date: Sep. 28, 2009

(87) PCT Pub. No.: WO2008/129849

PCT Pub. Date: Oct. 30, 2008

(65) Prior Publication Data

US 2010/0120379 A1 May 13, 2010

(30) Foreign Application Priority Data

Mar. 30, 2007 (JP) ................................ 2007-092796
Mar. 14, 2008 (JP) ................................ 2008-066193

(51) Int. Cl.
*H04M 1/00* (2006.01)

(52) U.S. Cl. .................. 455/575.7; 455/562.1; 455/101; 455/63.1; 455/67.13; 455/566; 455/452.1; 370/334; 370/338; 375/267; 375/295

(58) Field of Classification Search ............... 455/575.7, 455/562.1, 101, 127.1, 450, 452.1, 63.1, 455/67.13, 67.14, 566; 370/334, 328, 338; 375/267, 295, 260
See application file for complete search history.

(56) References Cited

U.S. PATENT DOCUMENTS 7,417,974 B2 * 8/2008 Hansen ........................ 370/334
7,555,053 B2 * 6/2009 Trachewsky et al. ......... 375/267
7,599,420 B2 * 10/2009 Forenza et al. ............... 375/141
(Continued)

FOREIGN PATENT DOCUMENTS

JP 7-263940 10/1995
(Continued)

OTHER PUBLICATIONS

International Search Report dated Jul. 8, 2008.

(Continued)

*Primary Examiner* — Marceau Milord
(74) *Attorney, Agent, or Firm* — Dickinson Wright PLLC

(57) ABSTRACT

Provided is a MIMO communication device which can maintain the MIMO communication characteristic at a certain level regardless of the device installation position. The MIMO communication device (100) includes antenna elements (101-1, 101-2) as a first and a second antenna element which are arranged on a single straight line and an antenna element (102-1) or an antenna element (102-2) as a third antenna element which is arranged out of the straight line. A MIMO modulation unit (105) is connected to all the antenna elements. This assures that there exists a combination of antennas having other than 0 as a matrix expression of a channel estimation matrix in a propagation path between the MIMO communication device (100) and the communication partner regardless of the installation position of the MIMO communication device (100) with respect to a communication partner. As a result, it is possible to realize the MIMO communication device which can maintain the MIMO communication characteristic at a certain level or above regardless of the device installation position.

12 Claims, 8 Drawing Sheets

U.S. PATENT DOCUMENTS

| | | | | |
|---|---|---|---|---|
| 7,633,994 | B2 * | 12/2009 | Forenza et al. | 375/141 |
| 7,676,848 | B2 * | 3/2010 | Motooka et al. | 2/19 |
| 7,693,228 | B2 * | 4/2010 | Aldana et al. | 375/267 |
| 7,715,876 | B2 * | 5/2010 | Nakao | 455/562.1 |
| 7,809,020 | B2 * | 10/2010 | Douglas et al. | 370/474 |
| 7,826,871 | B2 * | 11/2010 | Sudo | 455/562.1 |
| 7,831,232 | B2 * | 11/2010 | Nakaya | 455/277.1 |
| 7,843,887 | B2 * | 11/2010 | Haga et al. | 370/332 |
| 7,844,013 | B2 * | 11/2010 | Hoshino et al. | 375/295 |
| 2007/0057855 | A1 * | 3/2007 | Mizoguchi et al. | 343/702 |
| 2009/0147878 | A1 | 6/2009 | Nakao | |

FOREIGN PATENT DOCUMENTS

| | | |
|---|---|---|
| JP | 2004-274633 | 9/2004 |
| JP | 2006-211566 | 8/2006 |
| JP | 2006-238468 | 9/2006 |
| JP | 2007-74446 | 3/2007 |
| JP | 3129971 | 3/2007 |

OTHER PUBLICATIONS

"Related technology of MIMO (Multi Input Multi Output)," JPO Documents, Standard Technologies, 2004, pp. 1-2, with English Translation.

* cited by examiner

MIMO COMMUNICATION DEVICE

TECHNICAL FIELD

The present invention relates to a MIMO communication apparatus.

BACKGROUND ART

In the field of radio communication equipment, MIMO (Multi-Input Multi-Output) communication, which uses array antennas, can increase the communication speed without expanding the frequency band in use, and improve the overall system throughput (see, for example, Non-Patent Document 1).

Recently, in the field of wireless LAN, introduction of MIMO communication technology is being studied to standardize IEEE 802.11n, This technology is mentioned in the draft of the standard by IEEE in 2007. Similarly, MIMO communication technology is also being studied to increase the data transmission speed of mobile telephones, mobile wireless data terminals and so on.

In a conventional wireless communication system not adopting MIMO communication technology, communication quality is determined by the electric field intensity in the receiving point. By contrast with this, in a communication system adopting MIMO communication technology, communication quality is determined not only by the electric field intensity in the receiving point but also by the state of the radio propagation communication channel between the transmitting side and the receiving side. Therefore, the MIMO communication system needs to monitor the state of the radio propagation communication channel (this is referred to as "channel estimation technique" and see, for example, Non-Patent Document 1, Chapter 2 to 3, "channel estimation/equalization technique"), and select optimal received parameters based on the monitored state of the radio propagation communication channel.

Particularly, in the MIMO communication system having a portable personal computer (PC) adopting MIMO communication technology, the location and environment in which radio equipment is placed and used change frequently. The changes in the location and environment, in which radio equipment is placed and used, influence the state of the radio propagation communication channel in the MIMO communication system. Therefore, when there is a specific relationship between an arrangement of antennas in radio equipment and propagation environment of the surroundings of the radio equipment, there are cases where the state of the radio propagation communication channel deteriorates. That is, there are cases where quality of MIMO communication deteriorates or the system throughput decreases.

Therefore, conventionally, there is a MIMO communication system as disclosed in, for example, Patent Document 1. In this MIMO communication system, the receiving station has: a state index calculating section that calculates a state index that represents the current communication state, using all or part of transfer functions; and a communication state display section that changes the content to display according to the value of the state index. Further, this receiving station has an external interface section that transfers the state index to an external terminal connected with the receiving station via wired or wireless connection. FIG. 1 shows a conventional MIMO communication apparatus disclosed in Patent Document 1.

The communication state index calculating circuit in FIG. 1 performs numerical calculation to calculate the state of the radio propagation communication channel as an index. The display section presents a display matching the resulting state index or a state index obtained by combining state indices calculated according to a plurality of methods. Then, by referring to the index displayed on the display section, the user can change the location to place the MIMO communication apparatus or control diversity in the MIMO communication system.

Further, the MIMO communication system disclosed in Patent Document 1 assumes a method generally referred to as "Zero-Forcing (ZF) method," as the method of detecting signals transmitted based on MIMO technology. The above communication state index calculating circuit decides the value of the determinant of the channel estimation matrix, so that it is possible to change the location to place the MIMO communication apparatus and controls diversity in the MIMO communication system.

Patent Document 1: Japanese Patent Application Laid-Open No. 2006-211566

Non-patent Document 1: JPO Documents, Standard Technologies, Electronics, 2004, "Related technology of MIMO(Multi Input Multi Output)," http://www.jpo.go.jp/cgi/link.cgi?url =/shiryou/s_sonota/hyoujun_gijutsu.htm

DISCLOSURE OF INVENTION

Problems to be Solved by the Invention

However, depending on the arrangement of antennas in the MIMO communication apparatus, there are cases where quality of MIMO communication deteriorates due to the relationship between the locations of antennas in the communicating party and the locations of the antennas in the MIMO communication apparatus. In this case, a conventional MIMO communication system requires its user to change the location to place the MIMO communication apparatus, according to the state index of the radio propagation communication channel, and therefore this is not user friendly. Further, for example, in case where the MIMO communication apparatus is a laptop PC, this PC is usually placed and fixed on a predetermined location on a desk.

Furthermore, in case where the MIMO communication system is adopted to a LAN communication system provided in, for example, an office, the relationship between the location of the access point (AP) and the location on a desk is fixed. Therefore, it is difficult to improve the state of a communication channel by changing the location to place the MIMO communication apparatus and there are cases where communication quality deteriorates. As described above, although the arrangement of antennas provided in the MIMO communication apparatus is an important factor in association with communication quality, the conventional techniques do not take this point into consideration.

It is therefore an object of the present invention to provide a MIMO communication apparatus that can maintain characteristics of MIMO communication at or above a certain level regardless of the location to set the MIMO communication apparatus.

Means for Solving the Problem

The MIMO communication apparatus according to the present invention employs a configuration which includes: a first antenna element and a second antenna element which are provided in locations on one straight line; a third antenna element which is provided in a location apart from the straight line; and a multi-input multi-output modulation-demodulation section which is connected with all of the first, second and third antenna elements.

Advantageous Effects of Invention

The present invention can provide a MIMO communication apparatus that can maintain characteristics of MIMO communication at or above a certain level regardless of the location to set the MIMO communication apparatus.

BEST MODE FOR CARRYING OUT THE INVENTION

Figure 1:
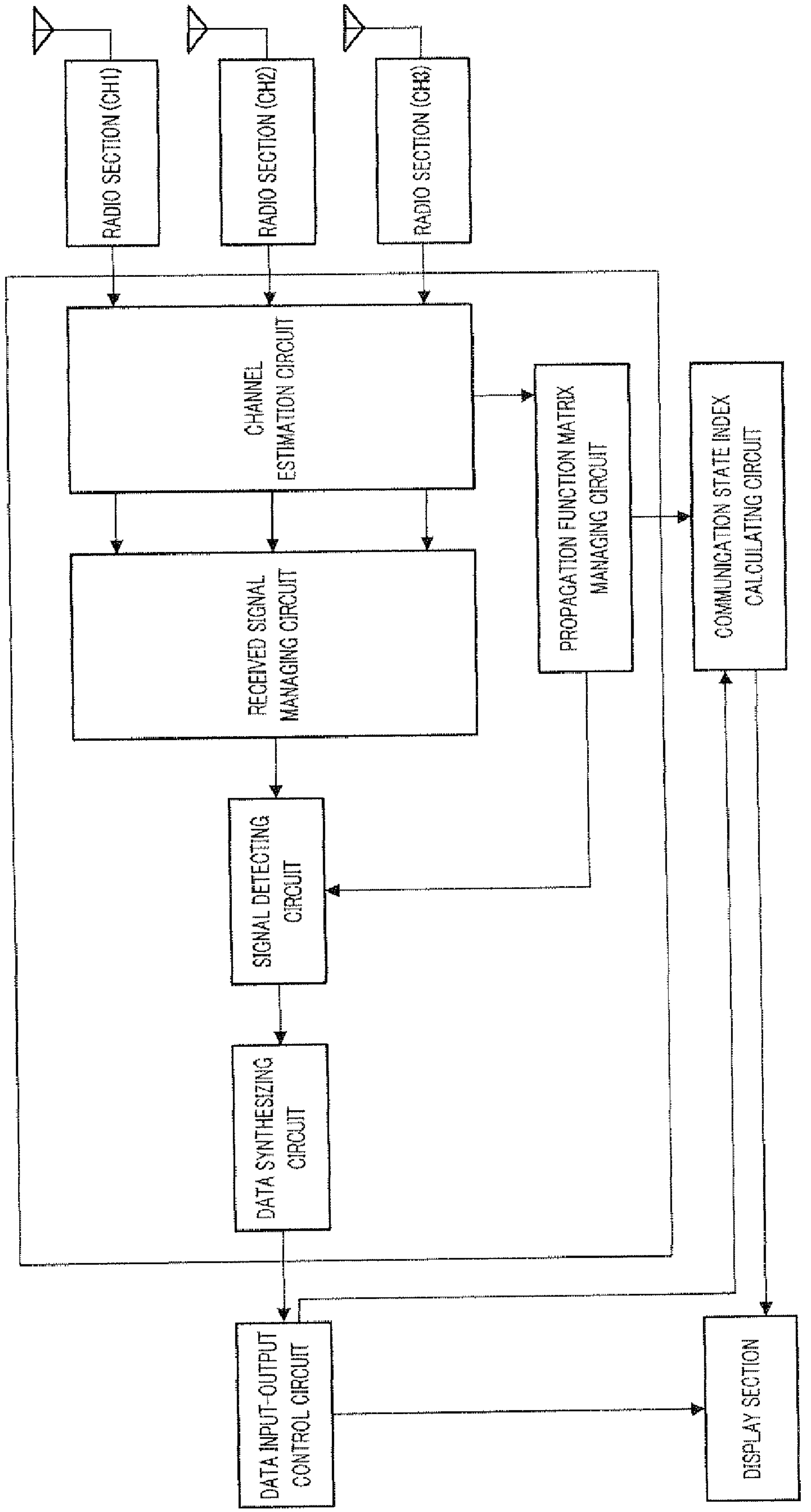
FIG. 1 is a block diagram showing a configuration of a conventional MIMO communication apparatus.

Embodiments of the present invention will be explained in detail with reference to the accompanying drawings. Further, in the following embodiments, the same components will be assigned the same reference numerals and overlapping explanation thereof will be omitted.

(Embodiment 1)

Figure 2:
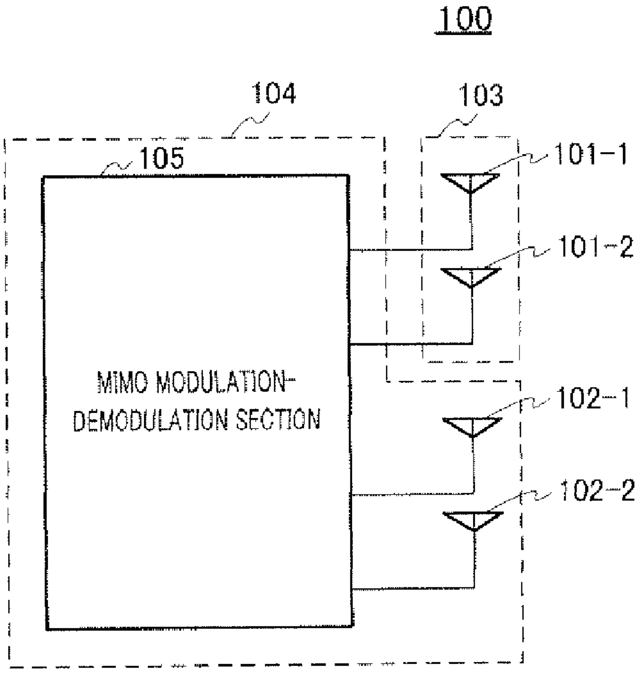
FIG. 2 is a block diagram showing a configuration of a MIMO communication apparatus according to Embodiment 1 of the present invention.

FIG. 2 is a block diagram showing the configuration of a MIMO communication apparatus according to Embodiment 1 of the present invention. MIMO communication apparatus 100 shown in the same figure has: antenna element 101-1 and antenna element 101-2 that are provided in locations on one straight line; antenna element 102-1 and antenna element 102-2 that are provided in locations apart from this straight line; and MIMO modulating section 105 that is connected with all of antenna elements (antenna element 101-1 and 101-2 and antenna element 102-1 and 102-2). MIMO communication apparatus 100 has first housing 103 and second housing 104.

First antenna element 101-1 and second antenna element 101-2 are provided in first housing 103. Further, third antenna element 102-1 and fourth antenna element 102-2 are provided in second housing 104.

Figure 3:
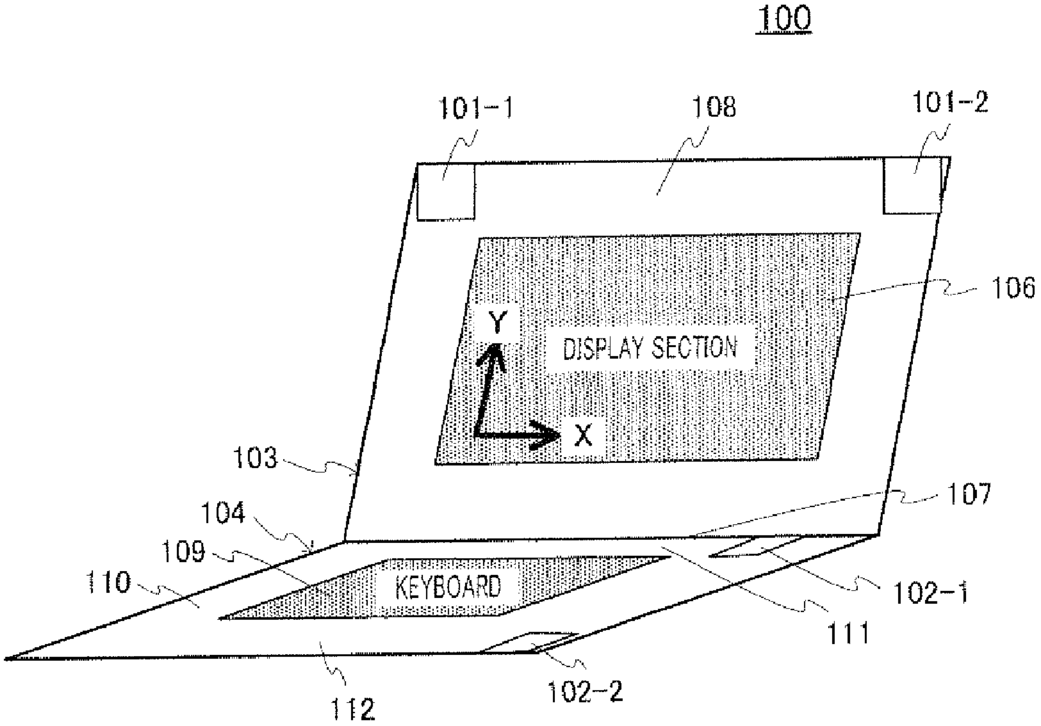
FIG. 3 shows an outlook of a portable personal computer (PC) in case where the MIMO communication apparatus according to Embodiment 1 is a portable personal computer.

In case where MIMO communication apparatus 100 is a portable personal computer (PC), the outlook of the portable PC is as shown in, for example, FIG. 3. As shown in the same figure, first housing 103 and second housing 104 are connected via connecting part 107. Particularly, FIG. 3 shows a case where MIMO communication apparatus 100 is a notebook PC. There are cases where first housing 103 and second housing 104 will be referred to below as "upper housing" and "lower housing," respectively.

First housing 103 has display section 106 that displays information which is transmitted from the communicating party side and which is a received signal demodulated in MIMO modulation-demodulation section 105. The display screen on display section 106 displays image information after dots are developed in the memory of the PC as information transmitted from the communicating party side. The coordinate system of this memory and the coordinate system on the display screen (for example, the X-Y coordinate system shown in FIG. 3) are associated with each other. When the PC is used, the upper portion of the display image is generally displayed on the side where the value of the Y coordinate is greater.

In upper side part 108 of first housing 103, that is, on the upper side of the display screen, first antenna element 101-1 and second antenna element 101-2 are provided. In other words, if it is assumed that connecting part 107 with second housing 104 provides one side part of first housing 103, first antenna element 101-1 and second antenna element 101-2 are provided in the other side part of first housing 103. In the same figure, at both ends of upper side part 108 (or at both ends of the other side part), first antenna element 101-1 and second antenna element 101-2 are provided.

Second housing 104 has keyboard part 109 which is a means for operating keys. In peripheral part 110 of second housing 104, that is, in the surrounding portion of keyboard part 109 of second housing 104, third antenna element 102-1 and fourth antenna element 102-2 are provided. In FIG. 3, third antenna element 102-1 is provided in upper side part 111 of second housing 104 on the upper side of keyboard part 109. Particularly, near one end of upper side part 111, third antenna element 102-1 is provided. Further, fourth antenna element 102-2 is provided in lower side part 112 of second housing 104 on the lower side of keyboard part 109. Particularly, near one end of lower side part 112, fourth antenna element 102-2 is provided.

Figure 4:
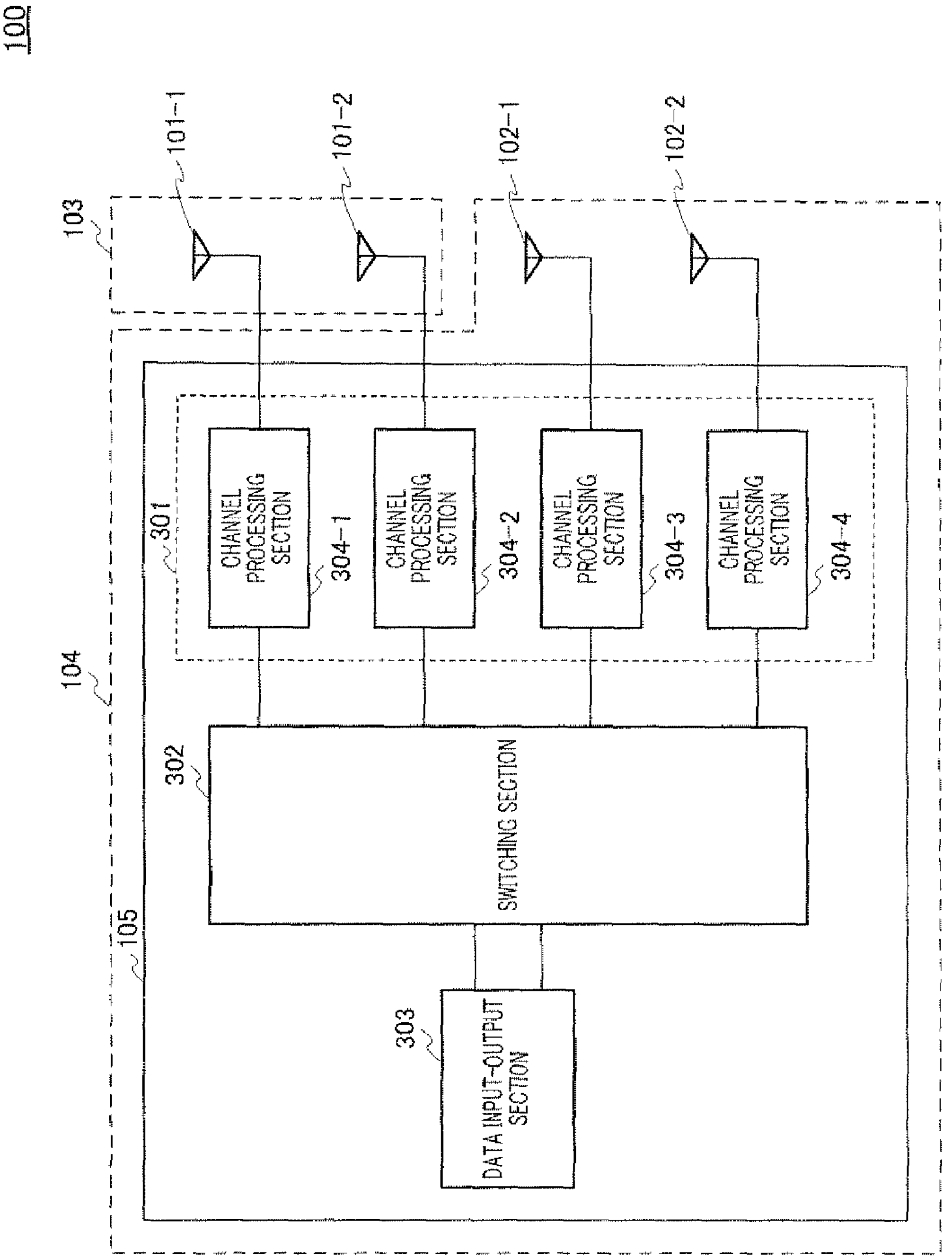
FIG. 4 is a block diagram showing the detailed configuration of the MIMO communication apparatus according to Embodiment 1.

FIG. 4 is a block diagram showing the configuration of MIMO communication apparatus 100 in detail.

As shown in the same figure, MIMO modulation-demodulation section 105 of MIMO communication apparatus 100 has: channel processing section 301; switching section 302 that switches the input and output destinations of signals between channel processing sections 304-1 to 304-4 according to antenna elements selected for use to perform communication; and data input-output section 303. Channel processing section 301 has channel processing sections 304-1 to 304-4 that match antenna elements 101-1 and 101-2 and antenna element 102-1 and 102-2.

MIMO modulation-demodulation section 105 acquires a plurality of channel estimation values related to channels between a plurality of antennas on the communicating party side and a plurality of antenna elements provided in MIMO communication apparatus 100. Further, MIMO modulation-demodulation section 105 sequentially selects a number of antenna elements equal to or more than the number of antennas used to perform communication on the communicating party side, from a plurality of antenna elements provided in MIMO communication apparatus 100. The antenna elements are selected based on every possible combination of antenna elements.

MIMO modulation-demodulation section 105 generates a channel estimation matrix based on channel estimation values matching each combination of selected antenna elements, and calculate the value of the determinant of this channel estimation matrix.

For example, when the communicating party side transmits two streams, that is, two signal sequences, from two antenna elements, MIMO modulation-demodulation section 105 selects two arbitrary antenna elements from more than two antenna elements provided in MIMO communication apparatus 100. Next, MIMO modulation-demodulation section 105 calculates a plurality of channel estimation matrices of 2 rows×2 columns for combinations of two selected antenna elements, and determines the combination of antenna elements that maximizes the value of the determinant of the channel estimation matrix of 2 rows×2 columns. Next, MIMO modulation-demodulation section 105 performs MIMO demodulation using the channel estimation matrix that maximizes the value of the determinant and signals received at the antenna elements used to derive the channel estimation matrix.

Here, MIMO demodulation is performed using the combination of antenna elements that maximizes the determinant. However, if the combination does not produce 0 as a determinant, MIMO demodulation can be performed by using this combination of antennas.

Next, the operation of MIMO communication apparatus 100 having the above configuration will be explained. Particularly, a case will be explained as an example where MIMO communication apparatus 100 is a portable personal computer (PC) on which a wireless LAN communication function is mounted.

As shown in FIG. 2 and FIG. 3, two antenna elements 101-1 and 101-2 set in upper housing 103 are provided almost linearly in upper side part 108 of upper housing 103. Particularly, a case will be explained where lower housing 104 is placed on a virtually horizontal desk, and a portable personal computer is used in a state where upper housing 103 is open. That is, this case refers to a case where two antenna elements 101-1 and 101-2 are provided in virtually horizontal locations, and the back face of the operating face of keyboard part 109 in lower housing 104 is placed on, for example, a desk on which a portable personal computer (PC) is used.

In this way, two antenna elements 101-1 and 101-2 are set in the highest locations in the portable PC, so that it is possible to increase the probability that the propagation environment between the potable PC and the AP of the communicating party provides the line-of-sight propagation environment. Further, antenna elements 101-1 and 101-2 are provided in the highest locations in the portable PC, so that it is possible to reduce propagation loss resulting from blocking by display section 106 (i.e. resulting from suppression of radiation in the direction of display section 106). Consequently, antenna elements 101-1 and 101-2 are provided in the highest locations in the portable PC, so that it is possible to increase the possibility that the propagation environment between the portable personal computer (PC) and the AP becomes good.

Further, a plurality of antenna elements 101-1 and 101-2 are provided in the separate locations in upper housing 103. A plurality of antenna elements 101-1 and 101-2 are provided in separate locations, so that it is possible to reduce antenna cross-correlation characteristics (or fading correlation characteristics) and, consequently, improve MIMO communication characteristics.

As described above, MIMO communication is fundamentally possible between the AP and MIMO communication apparatus 100 only by setting a plurality of antenna elements 101-1 and 101-2 in upper housing 103 of MIMO communication apparatus 100 except for cases where there is a certain relationship between the location of the AP and the location of MIMO communication apparatus 100 of an STA. Particularly, a conventional wireless LAN that does not adopt MIMO communication technology generally adopts such an arrangement of antenna elements to provide a diversity effect for improved received characteristics. Accordingly, in view of securing compatibility with conventional wireless LAN, antenna elements are generally arranged in such a way.

Figure 5:
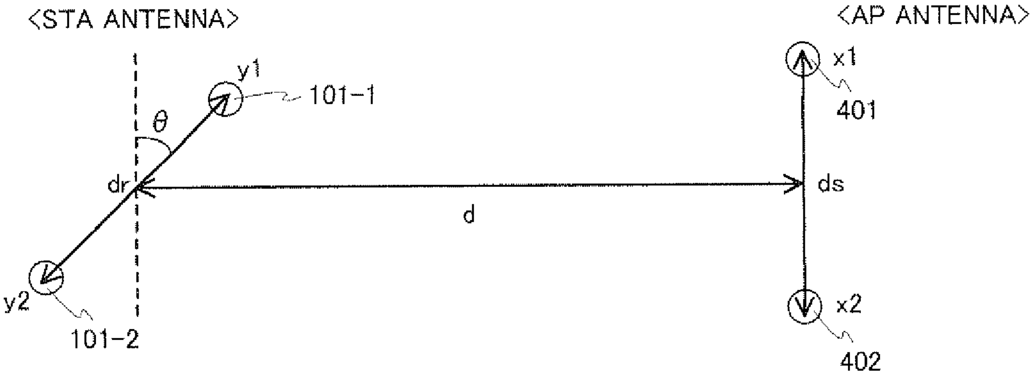
FIG. 5 shows the relationship between the locations of two antenna elements provided in the AP and the locations of two antenna elements provided in the MIMO communication apparatus.

However, in case where there is a certain relationship between the location of the AP and the location of MIMO communication apparatus 100, there are cases where MIMO communication is difficult between the AP and MIMO communication apparatus 100 only by using a plurality of antenna elements 101-1 and 101-2. FIG. 5 shows the relationship between the locations of two antennas provided in the AP and the locations of two antenna elements 101-1 and 101-2 provided in MIMO communication apparatus 100. FIG. 5 shows the relationship between the locations of these four antennas in the plane covering all locations where two antenna elements 101-1 and 101-2 and two antennas of the AP are arranged (hereinafter also referred to as "antenna arrangement plane"). The AP is generally set in a wall surface and so on. Then, a plurality of antennas provided in the AP are set linearly on the horizontal plane. By contrast with this, a portable personal computer (PC) is placed on the horizontal plane such as a desk which is apart from the AP to some degree, and is used. Generally, in case of a portable PC, while lower housing 104 is set on the horizontal plane, upper housing 103 is used in a virtually vertical state with respect to lower housing 104. Therefore, as described above, in case where antenna elements 101-1 and 101-2 are provided on a virtually straight line in upper side part 108 of upper housing 103, a plurality of antenna elements 101-1 and 101-2 are also arranged on a horizontal line.

Roughly speaking, the location to place a portable PC to use the PC moves every time the PC is used. Therefore, antenna elements 101-1 and 101-2 are less likely to be arranged in a state where, as shown in FIG. 5, the line on which antenna elements 101-1 and 101-2 are arranged and the line on which two antennas in the AP are arranged, are parallel on the antenna arrangement plane.

That is, the line on which antenna elements 101-1 and 101-2 are arranged and the line on which two antennas in the AP are arranged form an arbitrary azimuth angle θ. This azimuth angle θ changes randomly between 0 degree and 360 degrees depending on how a portable PC is placed.

Here, the value calculating the determinant of the channel estimation matrix in association with a channel estimation value (i.e. theoretical value) in the MIMO communication system, and the value of the communication capacity acquired based on this calculated value are derived.

The location to place antenna element 101-1 of MIMO communication apparatus 100 of the STA is y1, the location to place antenna element 101-2 is y2 and the interval between both antenna elements is dr. Further, the location to place first antenna element 401 in the AP is x1, the location to place second antenna element 402 is x2 and the interval between both antenna elements is ds. Furthermore, the distance between the center of the antenna array of MIMO communication apparatus 100 and the center of the antenna array of the AP is d.

At this point, the distance between each antenna may be determined as follows using the geometric relationship.

The inter-antenna distance $L_{11}$ between antenna element 101-1 and antenna element 401 is determined according to equation (Equation 1)

$$L_{11} = \sqrt{\left(d - \frac{dr}{2}\sin\theta\right)^2 + \left(\frac{ds}{2} - \frac{dr}{2}\cos\theta\right)^2} \quad [1]$$

The inter-antenna distance $L_{12}$ between antenna element 101-1 and antenna element 402 is determined according to equation (Equation 2)

$$L_{12} = \sqrt{\left(d - \frac{dr}{2}\sin\theta\right)^2 + \left(\frac{ds}{2} + \frac{dr}{2}\cos\theta\right)^2} \quad [2]$$

The inter-antenna distance $L_{21}$ between antenna element 101-2 and antenna element 401 is determined according to equation 3.

(Equation 3)

$$L_{21} = \sqrt{\left(d + \frac{dr}{2}\sin\theta\right)^2 + \left(\frac{ds}{2} + \frac{dr}{2}\cos\theta\right)^2} \quad [3]$$

The inter-antenna distance $L_{22}$ between antenna element 101-2 and antenna element 401 is determined according to equation 4.

(Equation 4)

$$L_{22} = \sqrt{\left(d + \frac{dr}{2}\sin\theta\right)^2 + \left(\frac{ds}{2} - \frac{dr}{2}\cos\theta\right)^2} \quad [4]$$

Based on these relationships, the channel estimation value (i.e. theoretical value) is represented by equation 5.

(Equation 5)

$$h_{kl} = \frac{c}{4\pi f L_{kl}}(\cos\psi_{kl} - i\sin\psi_{kl}) \ldots \quad [5]$$

Here, k represents the antenna number of MIMO communication apparatus 100 of the STA. 1 represents the antenna number of the AP. In MIMO communication apparatus 100, the antenna number of antenna element 101-1 is 1 and the antenna number of antenna element 101-2 is 2. In the AP, the antenna number of antenna element 401 is 1, and the antenna number of antenna element 402 is 2. c is the speed of light. f is the frequency. Further, Ψk1 is a value determined according to equation 6.

(Equation 6)

$$\psi_{kl} = \frac{L_{kl}}{\lambda} \times 2\pi = \frac{2\pi f L_{kl}}{c} \quad [6]$$

In this equation 6, f is the frequency. c is the speed of light. λ is the wavelength.

Further, the communication capacity $C_{MIMO}$ is represented by equation 7 according to the information theory of Shannon (see above Non-Patent Document, Chapter 1 to 2 "capacity").

(Equation 7)

$$C_{MIMO} = \log_2\left[\det\left(\vec{I} + \frac{SNR}{m_s}\vec{h}\vec{h}^H\right)\right][\text{bit/s/Hz}] \quad [7]$$

Here, SNR is the received signal to noise ratio. I is the identify matrix. The matrix h is the matrix including $h_{k1}$ as an element. $m_s$ is the number of transmission antennas.

Figure 6:
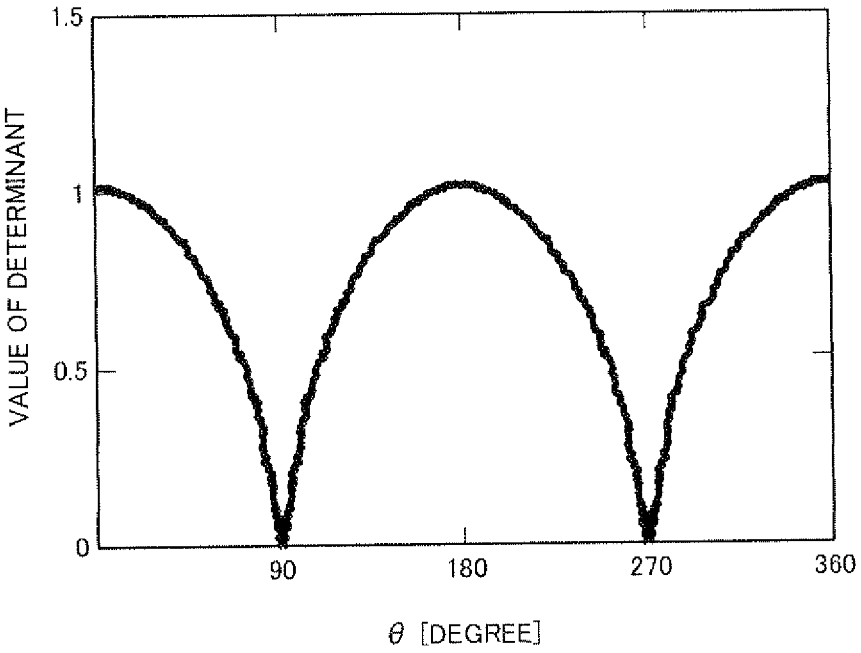
FIG. 6 shows how a value calculating a determinant of the channel estimation matrix changes when the angles θ formed between the antenna elements in the AP and the antenna elements in the MIMO communication apparatus are changed.

Next, the equations derived as described above are used to observe how the value calculating the determinant of the channel estimation matrix changes when the angles θ between the antennas in the AP and the antennas in MIMO communication apparatus 100 are changed. FIG. 6 shows the value calculating the determinant of the channel estimation matrix in case where the angle is θ when MIMO communication is performed between the two antennas in the AP and the two antenna elements in MIMO communication apparatus 100.

As is clear from FIG. 6, when the angles θ become 0 degree and 180 degrees, the value of the determinant maximizes. Then, the value of the determinant decreases when the angle θ shift from 0 degree and 180 degrees, and becomes 0 at 90 degrees and 270 degrees. This is because, when the angles θ become 90 degrees and 270 degrees, the relationships of $h_{11}=h_{12}$ and $h_{21}=h_{22}$ are satisfied between elements of the channel estimation matrix calculated according to equation 5.

Figure 7:
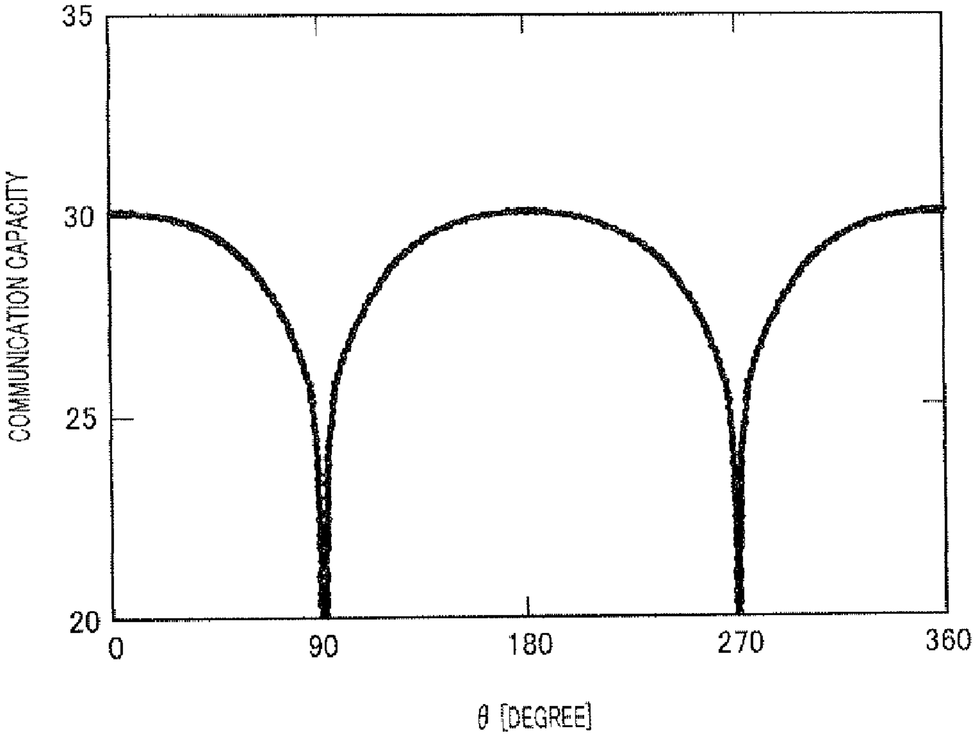
FIG. 7 shows how the communication capacity of the MIMO communication system changes when the angles θ formed between the antenna elements in the AP and the antenna elements in the MIMO communication apparatus are changed.

Further, FIG. 7 shows how the communication capacity of the MIMO communication system changes when the angles θ formed between the antennas in the AP and the antenna elements in MIMO communication apparatus 100 (see FIGS) are changed. The condition of constant transmission power is applied here.

As is clear from FIG. 7, when the angles θ become 0 degree and 180 degrees, the communication capacity of the MIMO communication system maximizes. Moreover, the communication capacity of the MIMO communication system decreases when the angles θ shift from 0 degree and 180 degrees, and become 0 at 90 degrees and 270 degrees. That is, when the angles θ become 90 degrees and 270 degrees, MIMO communication between the AP and MIMO communication apparatus 100 is difficult. Further, even if received power on the receiving side is enough when then angles θ are near 90 degrees and 270 degrees, it is difficult to secure the desired communication capacity.

By the way, now, in access points that conform to the wireless LAN standards IFEE802.11a, b, g, vertically-polarized antennas such as dipole antennas that have two antenna shapes arranged in parallel, monopole antennas, and sleeve antennas are provided. Further, these vertically-polarized antennas perform diversity reception. At a station (hereinafter, also referred to as "STA"), two antennas perform diversity reception.

In wireless LAN adopting MIMO communication technology, radio communication is performed between the AP having a plurality of antennas and the STA having a plurality of antennas, Further, a typical radio propagation environment in which the determinant of the channel estimation matrix becomes 0, provides the line-of-sight propagation environment between the STA and the AP and, no matter what any antenna element is selected on the receiving side, the distances between the selected antenna elements and a plurality of antennas become equal. In this environment, the amplitudes and phases of a plurality of communication signal streams transmitted from a plurality of antennas become equal in a plurality of receiving antenna elements, and, consequently, the determinant of the channel estimation matrix becomes 0.

In this case, it is difficult to demodulate a plurality of communication signal streams on the receiving side. This theory matches with the phenomenon shown in FIG. 6. Generally, a case where a plurality of antenna elements provided in the AP assume that communication signal streams transmitted from a plurality of antennas have an equal phase, refers to a case where a plurality of transmission antenna elements are assumed as one array antenna and receiving antenna elements of the STA are provided in the direction of the peaks in this array antenna directivity pattern.

That is, when a plurality of communication signal streams are transmitted separately in the MIMO communication system, it is demanded that the antenna correlation, that is, the fading correlation value, is decreased to improve the communication capacity. To meet this demand, generally, the intervals between a plurality of antennas are set to equal to or more than a half-wavelength and a plurality of antennas are set sufficiently apart from each other. In a state where the antenna intervals between a plurality of antennas in an array antenna are much longer than the half-wavelength, grating lobes are produced.

Accordingly, when the antenna intervals are made longer, more peaks in the array antenna directivity are produced. At this time, if output power of each transmission antenna is made equal, the amplitude of each propagating radio wave at the receiving antenna is made equal. In case where the array of a plurality of receiving antenna elements in the STA matches with the direction of peaks in the array antenna directivity in the AP of the transmitting side, the distances between a plurality of receiving antennas and a plurality of transmitting antennas become equal. Accordingly, the determinant of the channel estimation matrix becomes 0 in this case.

Further, when two or more antenna elements are set in arbitrary locations in the upper housing, and the upper housing and the lower housing are set at 90 degrees, the communication capacity deteriorates as described above, that is, the value of the determinant of the channel estimation matrix becomes 0.

Only the relationship between antenna elements 101-1 and 101-2 in MIMO communication apparatus 100 and antenna elements 401 and 402 in the AP has been observed so far. However, in MIMO communication apparatus 100, antenna elements 102-1 and 102-2 are provided apart from one straight line on which antenna elements 101-1 and 101-2 are provided. By so doing, even when the angle θ formed by antenna elements 101-1 and 101-2 is 90 degrees or 270 degrees, it is possible to realize the arrangement of antenna elements that does not make the communication capacity 0. The outputs from the antenna elements arranged in this way are inputted in MIMO modulation-demodulation section 105, and MIMO modulation-demodulation section 105 switches received signals or performs calculation to separate signals using the pseudo inverse matrix, so that it is possible to detect transmission data transmitted from the transmitting side.

In MIMO communication apparatus 100 shown in FIG. 4, signals received at four antenna elements are inputted in channel processing section 301 and channel estimation values are calculated in channel processing section 301. In case where, for example, two communication streams are transmitted from the transmitting side, switching section 302 selects two arbitrary outputs from the outputs of four channel processing sections 304-1 and 304-4. Further, switching section 302 forms a channel estimation matrix using the channel estimation values matching the selected output out of the channel estimation values calculated in channel processing sections 304-1 and 304-4, and calculates the determinant of this channel estimation matrix. This determinant is calculated for every possible combination of outputs by sequentially changing the two outputs to select.

Consequently, MIMO modulation-demodulation section 105 can perform MIMO demodulation by selecting combinations that do not produce 0 as the determinant or combinations that produce great determinants.

With the arrangement of antenna elements in MIMO communication apparatus 100 shown in FIG. 3, there are the above combinations that do not produce 0 as the determinant, regardless of the relationship between the location of the AP and the location where MIMO communication apparatus 100 is used. The desired communication capacity is secured by performing MIMO demodulation using such combinations of antenna elements. Further, in case where the transmitting side transmits three communication streams, MIMO modulation-demodulation section 105 only needs to perform MIMO demodulation processing in the same way as the above two streams subjected to MIMO demodulation processing, by performing inverse matrix calculation of the nine elements of the determinant with respect to the outputs of three arbitrary communication channel processing sections.

In case where all outputs from channel processing sections 304-1 to 304-4 matching four antenna elements are used, the dimension of the channel matrix is two-dimensional when the number of transmission streams is two, and is three-dimensional when the number of transmission streams is three. In such a case, the essential requirement is that MIMO modulation-demodulation section 105 performs MIMO demodulation processing using the pseudo inverse matrix. According to the arrangement of antenna elements employed in MIMO communication apparatus 100 of the present embodiment, the dimension of the channel matrix does not degenerate.

Consequently, the pseudo inverse matrix can always be determined. By contrast with this, upon MIMO modulation, switching section 302 selects antenna elements to use for transmission, according to the number of transmission signal streams. Channel processing section 301 supporting the selected antenna elements adds channel estimation signals to transmission signals.

Next, a modified example of the arrangement of antenna elements in MIMO communication apparatus 100 will be explained.

Figure 8:
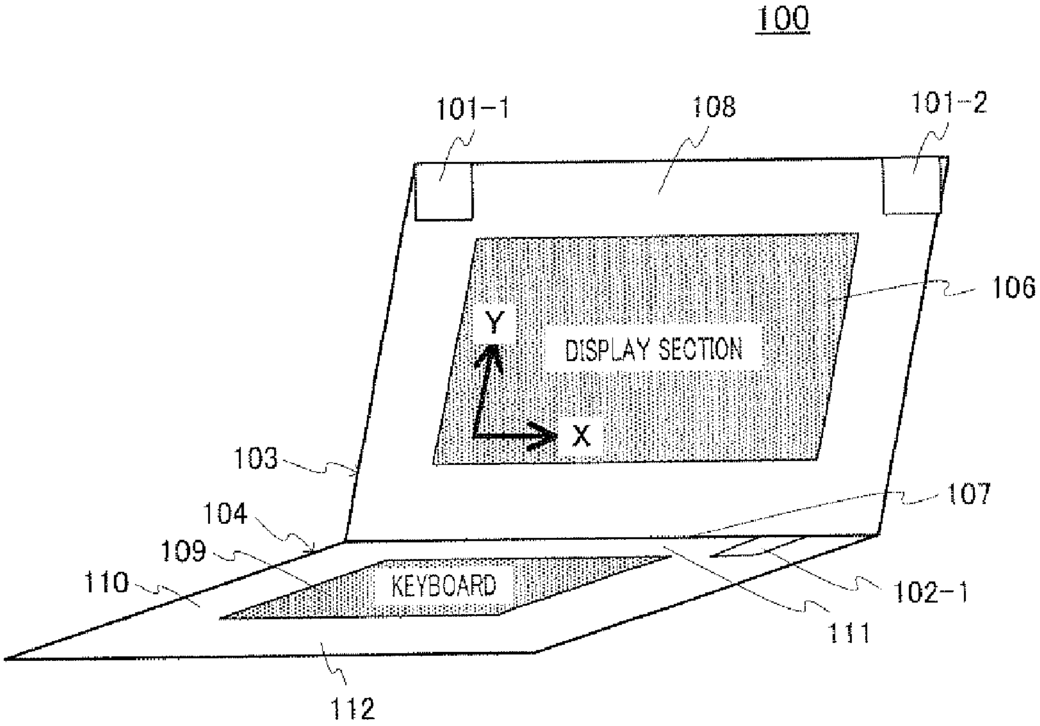
FIG. 8 shows a modified example of an arrangement of antenna elements in the MIMO communication apparatus according to Embodiment 1.

Lower housing 104 of MIMO communication apparatus 100 shown in FIG. 8 has only antenna element 102-1. Further, antenna element 102-1 is arranged in or near connecting part 107 between upper housing 103 and lower housing 104. A keyboard is generally set in the lower housing of a portable PC. Therefore, an antenna element can be set in any location of the lower housing outside the location where the keyboard is set. In FIG. 8, antenna element 102-1 is set particularly in space between keyboard part 109 and the jointing part (i.e. connecting part 107).

The keyboard of a portable PC is operated in a state where the user of this PC places hands near both ends of lower side part 112 of lower housing 104. Therefore, if antenna elements are provided near both ends of lower side part 112 of lower housing 104 on the lower side of keyboard part 109, the user's hands cover the antenna elements, and cause deterioration of communication quality.

Then, it is possible to prevent deterioration of communication quality by providing antenna element 102-1 in or near connecting part 107 between upper housing 103 and lower housing 104, that is, in upper side part 111 of lower housing 104 on the upper side of keyboard part 109. Further, for the same reason, it is also possible to prevent deterioration of communication quality by, as shown in FIG. 9, providing antenna element 102-1 around the center of lower side part 112 of lower housing 104 on the lower side of keyboard part 109.

Figure 9:
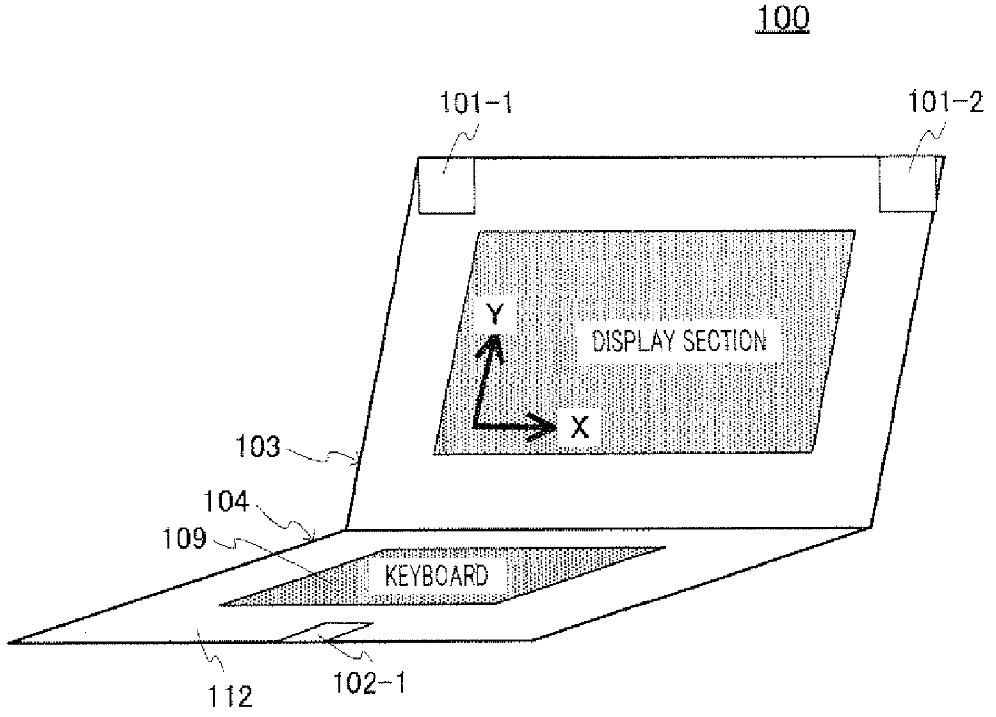
FIG. 9 shows a modified example of an arrangement of antenna elements in the MIMO communication apparatus according to Embodiment 1.
Figure 10:
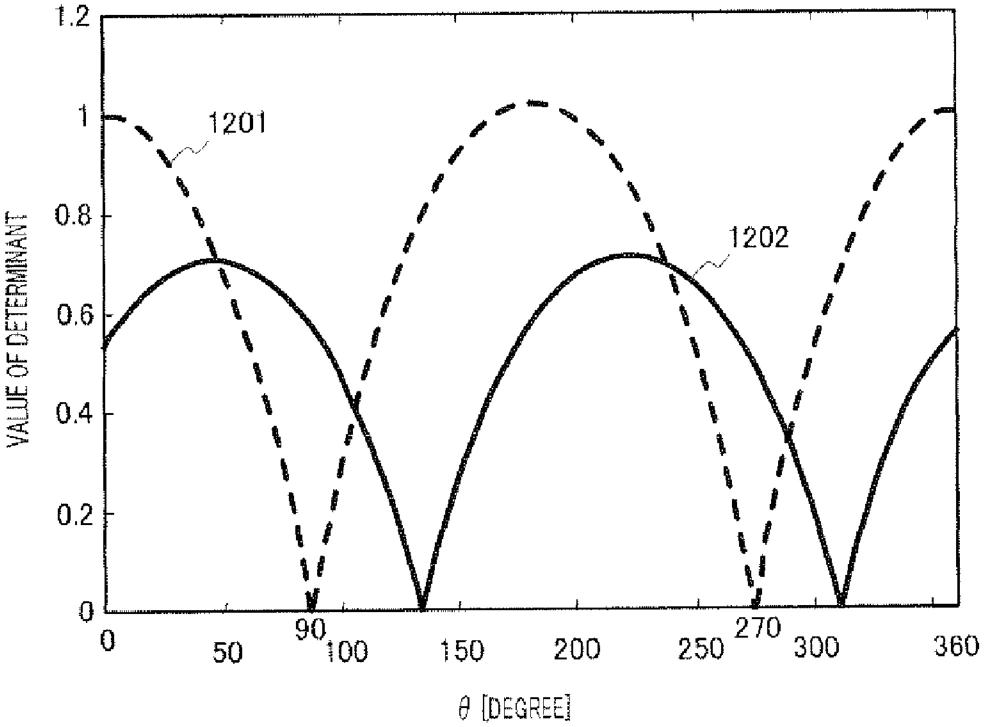
FIG. 10 shows how the determinant changes when the arrangement of antenna elements shown in FIG. 9 is employed and the angles θ are changed.

FIG. 10 shows how the determinant changes when the arrangement of antenna elements shown in FIG. 9 is employed and when the angle θ is changed. In FIG. 10, curve 1201 shows the value calculating the determinant related to signals received at two antenna elements 101-1 and 101-2 of upper housing 103. Curve 1202 shows the value calculating the determinant related to signals received at one of antenna elements 101-1 and 101-2 of upper housing 103 and antenna element 102-1 set in lower housing 104. Curve 1201 matches with the curve shown in FIG. 6. That is, when the azimuth angle θ is 90 degrees and 270 degrees, the determinant becomes 0.

By contrast with this, when the angle θ of curve 1201 is different from curve 1202, curve 1202 produces 0 as the value of the determinant. That is, no matter what value the angle θ takes, the value calculating the determinant related to signals received at antenna elements 101-1 and 101-2, and values calculating the determinant related to signals received at one of antenna elements 101-1 and 101-2 of upper housing 103 and received at antenna element 102-1 set in lower housing 104, never become 0 at the same time. That is, if antenna elements are arranged as shown in FIG. 9, there are combinations of antenna elements at all times that do not produce 0 as the value of the determinant. Consequently, MIMO modulation-demodulation section 105 can perform MIMO demodulation by selecting the combination that does not produce 0 as the determinant. Then, it is possible to acquire the desired MIMO communication capacity in the MIMO communication system.

Figure 11:
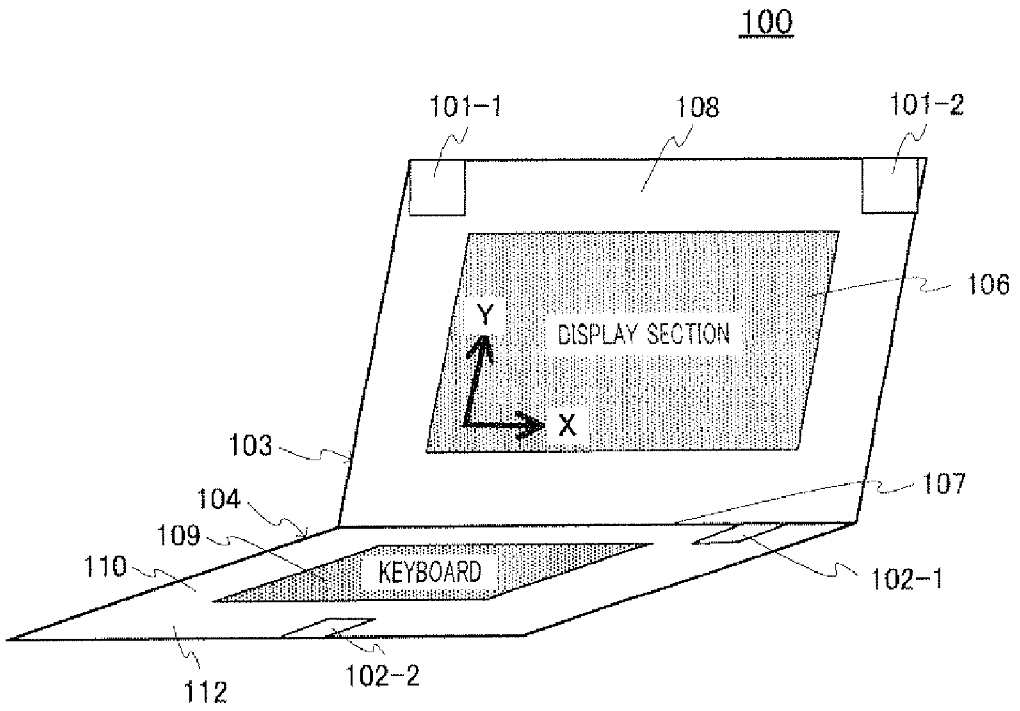
FIG. 11 shows a modified example of the arrangement of antenna elements in the MIMO communication apparatus according to Embodiment 1.

In lower housing 104 of MIMO communication apparatus 100 shown in FIG. 11, antenna element 102-1 is provided in or near connecting part 107 between upper housing 103 and lower housing 104. Antenna element 102-2 is set around the center of lower side part 112 of lower housing 104 on the lower side of keyboard part 109. That is, the arrangement of antenna elements shown in FIG. 11 combines the arrangements of antenna elements in FIG. 9 and FIG. 10.

Arranging antenna elements in lower housing 104 as shown in FIG. 11 provides the following advantage. As described above, the user's hands are likely to cover the locations to place antenna elements 102-1 and 102-2. Antenna elements are provided in a plurality of locations in this way, so that, even if the user's hands cover one of locations to place antenna elements, the other location to place the antenna element is less likely to be covered. Consequently, an antenna element that is not covered by the user's hands is selected, so that the influence of the user's hands upon the communication capacity is canceled.

Further, a plurality of antenna elements are arranged in lower housing 104 as shown in FIG. 11 and, consequently, the conditions of shadowing by upper housing 103 are different. Consequently, even when the radio wave between the AP and antenna element 102-1 of lower housing 104 is influenced by shadowing by upper housing 103, there is a high possibility that antenna element 102-2 of lower housing 104 is not influenced by shadowing by upper housing 103. In such a case, antenna element 102-2 is selected and, consequently, the influence upon the communication capacity due to shadowing by upper housing 103 is cancelled.

To be more specific, when the user's hands cover antenna element 102-2, low received power is detected at antenna element 102-2 and, consequently, MIMO modulation-demodulation section 105 can perform MIMO modulation by selecting a combination of antenna elements not including antenna element 102-2 by switching section 302.

Further, in case where the radio wave to antenna element 102-1 of lower housing 104 is blocked by display section 106 and antenna element 102-1 enters a non-line-of-sight from the AP, low received power of antenna element 102-1 of lower housing 104 is detected and, consequently, MIMO modulation-demodulation section 105 can perform MIMO demodulation by selecting a combination of antenna elements not including antenna element 102-1 by switching section 302.

Figure 12:
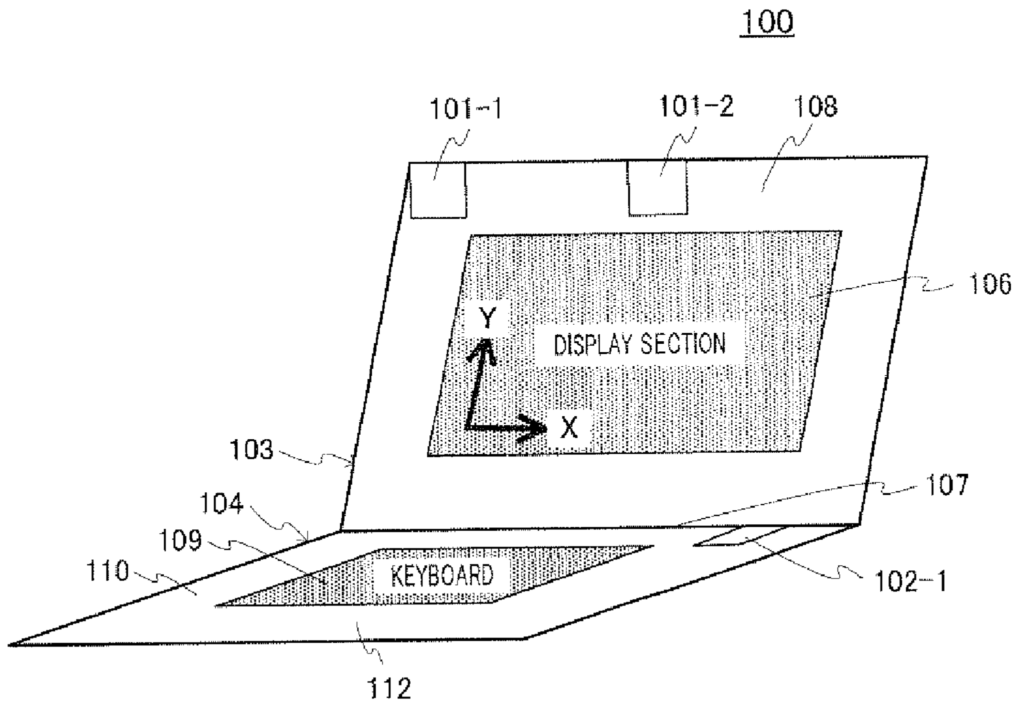
FIG. 12 shows a modified example of the arrangement of antenna elements in the MIMO communication apparatus according to Embodiment 1.

Similar to FIG. 8, in lower housing 104 of MIMO communication apparatus 100 shown in FIG. 12, antenna element 102-1 of lower housing 104 is provided in or near connecting part 107 between upper housing 103 and lower housing 104. Further, apart from FIG. 8, in upper housing 103, antenna element 101-1 and antenna element 101-2 of upper housing 103 are provided on a virtually straight line at one end and in the center of upper side part 108 of upper housing 103.

When antenna elements are arranged in this way, regardless of whether upper housing 103 is open or closed with respect to lower housing 104 or regardless of the relationship between the location of MIMO communication apparatus 100 and the location of the AP, the azimuth angles θ of antenna elements 101-1 and 101-2 of upper housing 103 with respect to the AP, and the azimuth angle θ of the line connecting antenna element 102-1 of lower housing 104 and one of antenna elements 101-1 and 101-2 of upper housing 103, never match. By this means, it is possible to alleviate deterioration of the MIMO communication capacity caused when the azimuth angles of antenna elements 101-1 and 101-2 of upper housing 103 and antenna element 102-1 of lower housing 104 match.

Further, a case has been explained above where the AP performs transmission and MIMO communication apparatus 100 performs reception. That is, communication that is generally referred to as "downlink" has been explained. The above example is directed to downlink MIMO communication where the AP sends out two streams from two antennas and the PC receives the streams at three or more antennas.

Such MIMO communication is also realized in uplink. That is, MIMO communication apparatus 100 transmits two streams from two antennas and the AP receives the streams at three antennas. In this case, the essential requirement is that MIMO modulation-demodulation section 105 selects one of arbitrary combinations of three or more antennas (with the above example, these combinations are each formed with two antennas) provided in MIMO communication apparatus 100, and transmits modulated signals through antennas included in the selected combination. Further, MIMO modulation-demodulation. section 105 may fix the selected combination from the time communication is established to the time communication ends, or adaptively change the combination of antennas to use for transmission, based on the criterion to select antennas as described above.

A ease has been explained with Embodiment 1 where the MIMO communication apparatus is a portable PC. However, the MIMO communication apparatus is not limited to portable PC's and may be flip mobile telephones or laptop PC's.

According to the present embodiment, MIMO communication apparatus 100 has: antenna elements 101-1 and 101-2 which are the first and second antenna elements provided in locations on a one straight line; antenna element 102-1 or antenna element 102-2 which is the third antenna element provided in the location apart from the straight line; and MIMO modulation-demodulation section 105 that is connected with all antenna elements.

According to the above configuration, regardless of no matter where MIMO communication apparatus 100 is set with respect to the communicating party, there is always a combination of antenna elements that does not produce 0 as a determinant of a channel estimation matrix in the channel between MIMO communication apparatus 100 and the communicating party. As a result, regardless of the location to set the MIMO communication apparatus, it is possible to realize a MIMO communication apparatus that can maintain MIMO communication characteristics at or above a certain level.

Further, antenna elements 101-1 and 101-2 are provided in upper housing 103, and antenna elements 102-1 or antenna element 102-2 and MIMO modulation-demodulation section 105 are provided in lower housing 104.

According to the above configuration, antenna element 102-1 or antenna element 102-2 is provided in the housing in which MIMO modulation-demodulation section 105 is provided, so that it is possible to improve stability of communication of MIMO communication apparatus 100. That is, antenna elements 101-1 and 101-2 are provided in a different housing from the housing in which MIMO modulation-demodulation section 105 is provided.

Accordingly, the connection lines between elements 101-1 and 101-2 and MIMO modulation-demodulation section 105 are provided throughout upper housing 103 and lower housing 104. For example, in case where MIMO communication apparatus 100 is a portable PC, the connection lines between antenna elements 101-1 and 101-2 and MIMO modulation-demodulation section 105, pass inside, for example, hinges connecting upper housing 103 and lower housing 104. Therefore, cases might occur where these connection lines are cut.

However, the present embodiment employs a configuration where antenna element 102 is provided in lower housing 104 in which MIMO modulation-demodulation section 105. The connection line between this antenna element 102 and MIMO modulation-demodulation section 105 is less likely to be cut than the connection lines between antenna elements 101-1 and 101-2 and MIMO modulation-demodulation section 105.

Consequently, in case where communication is not possible by using one of antenna elements 101-1 and 101-2 due to the line cut, MIMO communication can be performed by using one of available antenna elements 101-1 and 101-2 and using antenna elements 102-1 or antenna element 102-1 provided in lower housing 104.

In this case, it is possible to further improve stability of communication of MIMO communication apparatus 100.

Further, antenna elements 101-1 and 101-2 are provided in upper side part 108 of first housing 103 on the upper side of the display screen provided in display section 106.

By so doing, when MIMO communication apparatus 100 is used, antenna elements 101-1 and 101-2 are provided in the locations in MIMO communication apparatus 100 that might move to the highest locations. As a result, it is possible to increase the probability that the propagation environment between MIMO communication apparatus 100 and the communicating party provides the line-of-sight.

Further, a plurality of antenna elements 101-1 and 101-2 are provided in the separate locations in upper housing 103. Preferably, a plurality of antenna elements 101-1 and 101-2 are provided at both ends of upper side part 108 of upper housing 103.

By so doing, it is possible to reduce antenna cross-correlation characteristics (or fading correlation characteristics) and, consequently, improve MIMO communication characteristics.

Further, by providing antenna element 102-1 in upper side part 111 of second housing 104 on the upper side of the operating face of keyboard part 109, it is possible to prevent deterioration of communication quality caused when the user's hands cover antenna elements. Furthermore, by providing antenna element 102-1 in the center of lower side part 112 of second housing 104, it is possible to prevent deterioration of communication quality caused when the user's hands cover antenna elements.

(Embodiment 2)

Figure 13:
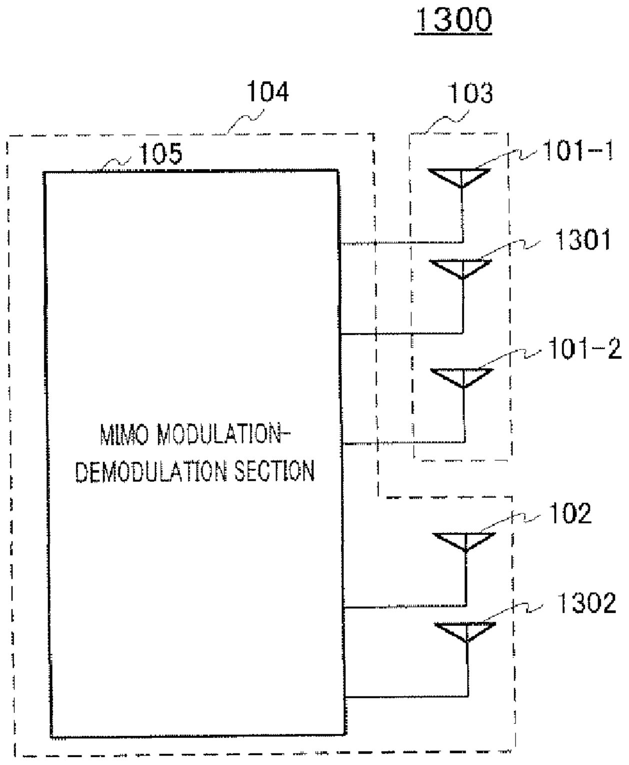
FIG. 13 is a block diagram showing the configuration of the MIMO communication apparatus according to Embodiment 2.

FIG. 13 is a block diagram showing the configuration of the MIMO communication apparatus according to Embodiment 2 of the present invention.

As shown in the same figure, MIMO communication apparatus 1300 has antenna element 1301 that is provided on a straight line on which there are antenna element 101-1 and antenna element 101-2 in upper housing 103; and antenna element 1302 that is provided in lower housing 104. With Embodiment 2, antenna element 101-1, antenna element 101-2 and antenna elements 102 are the first polarized antenna elements. Antenna element 1301 and antenna element 1302 are the second polarized antenna elements different from the first polarized antenna elements. Further, MIMO modulation-demodulation section 105 is connected with all of antenna elements provided in MIMO communication apparatus 100.

Figure 14:
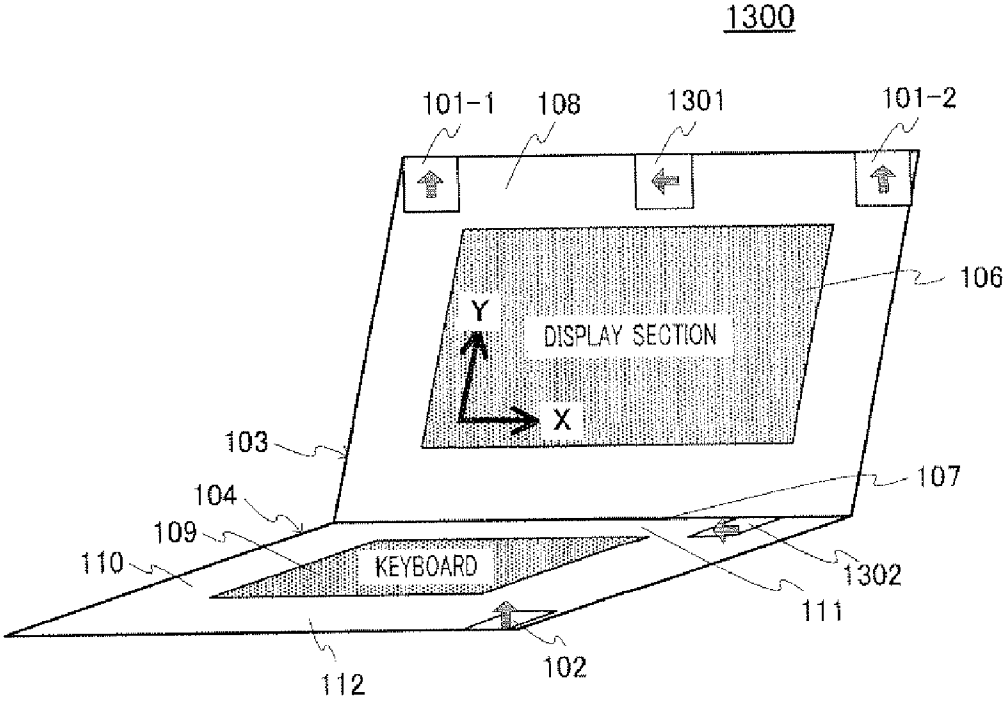
FIG. 14 shows an outlook of a portable personal computer (PC) in case where the MIMO communication apparatus according to Embodiment 2 is the portable personal computer.

In case where MIMO communication apparatus 1300 is a portable personal computer (PC), the outlook of this portable personal PC is as shown in, for example, FIG. 14.

In upper side part 108 of first housing (i.e. upper housing) 103, that is, on the upper side of the display screen, second polarized antenna element 1301 is provided in addition to first polarized first antenna element 101-1 and second antenna element 101-2. In the same figure, particularly, first antenna element 101-1 and second antenna element 101-2 are provided at both ends of upper side part 108, and antenna element 1301 is provided around the center of upper side part 108.

In peripheral part 110 of second housing (i.e. lower housing) 104, first polarized antenna element 102 and second polarized antenna element 1302 are provided. In FIG. 14, particularly, antenna element 1302 is provided in upper side part 111 of second housing 104 on the upper side of keyboard part 109. Particularly, antenna element 1302 is provided near one end of this upper side part 111. Further, antenna element 102 is provided in lower side part 112 of second housing 104 on the lower side of keyboard part 109. Particularly, antenna element 102 is provided near one end of this lower side part 112.

However, for example, when the AP transmits and receives propagating waves using a plurality of vertically-polarized antennas, in the radio wave propagating environment in which wireless LAN is used, the propagating waves are reflected by wall surfaces of a room, floors and ceilings, thereby changing the polarization surface. It is generally assumed that propagating waves of different polarizations are transmitted through different channels. Therefore, the propagated phases of propagating waves of different polarizations are different from each other. Accordingly, depending on the radio wave propagating environment in which wireless LAN is used, in cases where only one type of polarized antenna elements are provided, there may be cases where quality of MIMO communication deteriorates due to the influence of reflected waves and so on.

By contrast with this, in MIMO communication apparatus 1300 according to the present embodiment, antenna element 1301 and antenna element 1302 which are the second polarized antenna elements different from the first polarized antenna elements are provided in addition to antenna element 101-1, antenna element 101-2 and antenna element 102 which are the first polarized antenna elements.

According to the above configuration, even in case where received quality at the first polarized antennas deteriorates on the receiving side due to the influence of reflection and so on, it is possible to prevent deterioration of quality of MIMO communication by selecting a combination of the second polarized antenna elements different from the first polarized antenna elements. That is, a plurality of antenna elements supporting respective polarizations are provided in MIMO communication apparatus 1300 and, consequently, there are combinations of different polarization patterns for combinations of antenna elements.

Therefore, when determinants related to combinations of one type of the polarization pattern produce 0 due to the influence of the reflected wave, determinants related to combinations of another type of the polarization pattern do not produce 0. Consequently, when the polarization pattern on the receiving side changes due to the influence of reflection and so on, it is possible to increase the possibility that the desired communication capacity is secured.

Although FIG. 14 shows a case where the first polarization pattern corresponds to the vertical polarization and the second polarization pattern corresponds to the horizontal polarization wave, these patterns may be switched. Further, combinations of polarization patterns are not limited to this. For example, the combinations of polarization patterns may include combinations of right-handed circular polarization and left-handed circular polarization and combinations of 45-degree-inclined polarization orthogonal to each other.

Further, FIG. 13 and FIG. 14 show that the second polarized antenna elements are provided in upper housing 103 and lower housing 104. Here, the location to place the second polarized antenna elements are not limited to this, and the second polarized antenna elements may be provided only in one of upper housing 103 and lower housing 104. Further, it may also be possible to use a modified example of the arrangement of antenna elements described in Embodiment 1 to arrange antenna elements in upper housing 103 and lower housing 104.

A case has been explained above where the AP performs transmission and MIMO communication apparatus 1300 performs reception. That is, communication that is generally referred to as "downlink" has been explained. The above-described example is directed to downlink MIMO communication where the AP sends out two streams from two antennas and the PC receives the two streams at three or more antennas.

Such MIMO communication is realized in uplink. That is, MIMO communication apparatus 100 transmits two streams from two antennas and the AP receives the two streams at three antennas. In this case, the essential requirement is that MIMO modulation-demodulation section 105 selects one of arbitrary combinations of three or more antennas (with the above example, these combinations are each formed with two antennas) provided in MIMO communication apparatus 100, and transmits modulated signals through antennas included in the selected combination. Further, MIMO modulation-demodulation section 105 may fix the selected combination from the time communication is established to the time communication ends, or adaptively change the combination of antennas to use for transmission, based on the criterion to select antennas as described above.

Furthermore, a case has been explained with Embodiment 2 where the MIMO communication apparatus is a portable PC. However, the MIMO communication apparatus is not limited to portable PC's and may be flip mobile telephones or laptop PC's.

In this way, according to the present embodiment, MIMO communication apparatus 1300 has: antenna elements 101-1; antenna elements 101-2; and a plurality of polarized antenna elements (antenna elements 1301 and 1302) different from polarized antenna element 102.

Thanks to the above configuration, in case where received quality at first polarized antenna elements deteriorates due to the influence of reflection and so on, it is possible to prevent deterioration of MIMO communication by selecting a combination of the second polarized antenna elements different from the first polarized antenna elements.

The disclosures of Japanese Patent Application No. 2007-092796, filed on Mar. 30, 2007, and Japanese Patent Application No. 2008-066193, filed on Mar. 14, 2008, including the specifications, drawings and abstracts, are incorporated herein by reference in their entirety.

Industrial Applicability

The MIMO communication apparatus according to the present invention provides an advantage of maintaining characteristics of MIMO communication at or above a certain level regardless of the location to set the MIMO communication apparatus, and is useful as a MIMO communication apparatus that can be applied to laptop PC's and portable PC's in which wireless LAN functions are mounted, mobile telephones and mobile data terminal.

The invention claimed is:

1. A multi-input multi-output communication apparatus comprising:

a first antenna element and a second antenna element which are provided in locations on one straight line;

a third antenna element which is provided in a location apart from the straight line; and a multi-input multi-output modulation-demodulation section which is connected with each of the first, second and third antenna elements, wherein the multi-input multi-output communication apparatus further comprises:

a first housing which comprises a display section that displays information acquired by demodulating a received signal in the multi-input multi-output modulation-demodulation section; and a second housing in which the third antenna element is provided, wherein:

the first and second antenna elements are provided in an upper side part of the first housing on an upper side of a display screen provided in the display section; and the third antenna is provided in a peripheral part of the second housing.

2. The multi-input multi-output communication apparatus according to claim 1, wherein the first and second antenna elements are provided at both ends of the upper side part of the first housing.

3. The multi-input multi-output communication apparatus according to claim 1, wherein the first and second antenna elements are provided in a center and one end of the upper side part of the first housing.

4. The multi-input multi-output communication apparatus according to claim 1, wherein:

the second housing comprises a key operating part; and the third antenna element is provided in an upper side part of the second housing on an upper side of an operating face of the key operating part.

5. The multi-input multi-output communication apparatus according to claim 4, further comprising a fourth antenna element provided in a center of a lower side part of the second housing.

6. The multi-input multi-output communication apparatus according to claim 1, wherein:

the second housing comprises a key operating part; and the third antenna element is provided in a lower side part of the second housing on a lower side of an operating face of the key operating part.

7. The multi-input multi-output communication apparatus according to claim 6, wherein the third antenna element is provided in a center of the lower side part of the second housing.

8. The multi-input multi-output communication apparatus according to claim 1, wherein polarization characteristics of the first antenna element, the second antenna element and the third antenna element comprise linear polarization.

9. The multi-input multi-output communication apparatus according to claim 1, wherein polarization characteristics of the first antenna element, the second antenna element and the third antenna element comprise circular polarization.

10. The multi-input multi-output communication apparatus according to claim 1, further comprising a plurality of antenna elements of a polarization pattern that is different from a polarization pattern of the first antenna element, the second antenna element and the third antenna element.

11. The multi-input multi-output communication apparatus according to claim 1, further comprising:

a fourth antenna element which is arranged on the straight line and which comprises polarization characteristics different from polarization characteristics of the first antenna element, the second antenna element and the third antenna element; and a fifth antenna element which is provided in a location apart from the straight line and which comprises the same polarization characteristics as the fourth antenna element.

12. The multi-input multi-output communication apparatus according to claim 1, wherein the multi-input multi-output modulation-demodulation section selects one combination from among arbitrary combinations of the first antenna element, the second antenna element and the third antenna element, and transmits modulated signals through antenna elements included in the selected combination.

* * * * *